April 14, 1970   J. F. SHERWOOD   3,505,809
THERMAL MOTOR
Filed May 20, 1968

INVENTOR.
John F. Sherwood
BY
Bertha L. MacGregor
ATTORNEY

3,505,809
THERMAL MOTOR

John F. Sherwood, Glendora, Calif., assignor to Thermal Hydraulics Corporation, Glendora, Calif., a corporation of California
Filed May 20, 1968, Ser. No. 730,456
Int. Cl. F03g 7/06
U.S. Cl. 60—23          4 Claims

ABSTRACT OF THE DISCLOSURE

A thermal motor comprising a high pressure housing, a chamber in the housing containing expansible material encased in sealing means which includes a resilient elastic portion, the housing having a bore therein, a piston shaft slidable in the bore, and a heating element in the chamber. The resilient elastic portion of the sealing means is elongated and extends into the bore. When the expansible material in the chamber is heated, it exerts pressure against the sealing means and causes the elongated portion to actuate the piston shaft.

---

This invention relates to a thermal motor provided with a piston shaft actuated by thermally controlled expansible material. The material may be wax or other suitable thermally responsive expansible material.

The main object of the invention is to provide novel sealing means in the motor housing for containing the expansibel material and for performing three important functions, namely, encasing the expansible material and preventing its escape from the encased chamber; permitting limited elongated of a portion of the sealing means when the expansible material is heated; and actuating the piston shaft by the elongated portion of the sealing means.

The sealing means embodying my invention comprises two wall members which define a closed chamber for containing the expansible material, one of said members being a flexible elastic diaphragm which responds by elongation to the expansion of the wax or other material in the chamber. The sealing members are mounted in a high pressure housing provided with an axially extending bore and a piston shaft slidable in the bore. The flexible elastic diaphragm member of the sealing means is supported and confined by the motor housing except in its central area which is located adjacent the inner end of the shaft bore and has a cup shaped portion which extends into the bore and becomes elongated by pressure of the expansible material against the inner surface of the cup shaped portion. The elongation or stretching of the diaphragm in that portion which extends into the bore causes the diaphragm to exert pressure against the piston shaft and to actuate the shaft for the purpose of imparting motion to other mechanisms such as valves, dampers, and the like.

Figure 1:
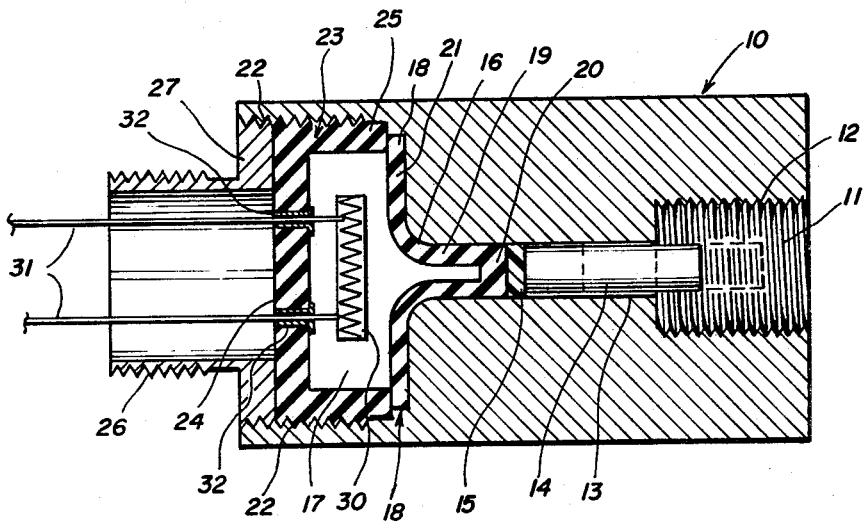
FIGURE 1 is a longitudinal sectional view of a thermal motor embodying the invention.

In that embodiment of the invention shown in the drawing, the high pressure housing 10 of bronze, steel or other suitable material is generally cylindrical in shape and uniform diameter. The housing is provided with a recess 11 defined by an annular internally threaded wall 12 for attachment to a support or for attachment of mechanism (not shown) to be actuated by the motor. The recess 11 communicates with a bore 13 in which are slidably mounted a piston shaft 14 and a "Teflon" (trademark) buffer disc 15.

Figure 2:
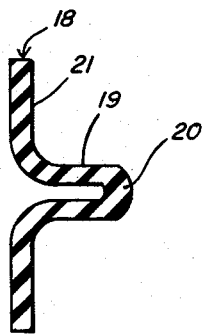
FIGURE 2 is a longitudinal sectional view of the diaphragm portion of the sealing means detached from the rest of the sealing means.

The housing 10 is internally contoured between the bore 13 and outer wall as indicated by the curved line 16 to form a pressure chamber 17 partially closed by a specially shaped diaphragm seal 18. The diaphragm seal 18 comprises an axially elongated cup shaped portion 19 extending into the housing bore 13, the cup shaped portion having an end 20 which abuts the buffer disc 15. The end 20 preferably is convex on its buffer abutting end, as shown in FIG. 2, instead of flat as shown in FIG. 1. The cup shaped portion 19 merges into a radially extending flat disc member 21 which is part of the diaphragm 18. The pressure chamber 17 is also partially enclosed by a seal member 23 comprising an end wall 24 and externally threaded side wall 25 circular in cross section transversely of the housing 10. The diaphragm 18 and seal member 23 together completely encase the contents of the chamber 17. The seal member 23 fits into a recess in the housing 10 defined by the internally threaded annular wall 22 engaged by threads on the side wall 25.

Outwardly of the wall 24 of the seal member 23, a shouldered neck member is mounted in the housing 10. The neck member consists of an externally threaded neck 26 and annular shoulder 27 mounted in the housing 10 by threads on the periphery of the shoulder 27 engaging the threaded wall 22 of the housing.

A heating element 30 in the chamber 17 is electrically connected by wires 31 to a source of electrical current. The wires extend through insulating seals 32 in the wall 24 of the seal member 23.

The diaphragm 18 is made of resilient material such as rubber which has sufficient elasticity to permit the elongated cup portion 19 to stretch longitudinally in axial direction in response to pressure exerted by expansion of the wax or other material in the chamber 17. The seal member 23 also is made of material which forms a good seal for the expansible material, but the wall 24 is sufficiently thick to resist stretching and the side wall 25 is confined by the housing wall 22. The disc portion 21 of the diaphragm bears on the curved surface 16 of the housing 10 and is prevented from distortion by the expansible material in the chamber 17. Thus only the cup portion 19 is free to expand to become elongated, and the expansion is limited to movement axially into the bore 13 into contact with the buffer 15 which abuts the inner end of the piston shaft 14.

The sealing means described, comprising the diaphragm 18–21 and members 23–25, supported by particular parts of the motor housing, thus positively encase the expansible material in the chamber 17 and permit elongation only of the cup shaped portion 19, and only in axial direction in the shaft bore 13.

When the wax or other expansible medium in the chamber 17 is heated by the element 30, the portion 19 of the diaphragm 18 becomes elongated to such an extent that the end 20 bears on the buffer 15 and moves the shaft 14 outwardly in axial direction to impart motion to mechanism (not shown) such as a valve, damper, or other work which requires limited movement. The broken lines indicate the movement of the shaft 14 in the bore 13. When current to the heating element is cut off, and the expansible material has cool and contracted, the piston shaft may be returned to initial position as shown in full lines in the drawing by any suitable means (not shown), such as a spring or other pressure exerting means on the work contacting end of the shaft.

I claim:
1. A thermal motor comprising
   (a) a high pressure housing provided with a longitudinally extending bore and an internally threaded recess,
   (b) a piston shaft slidable in the bore,

(c) a chamber in the housing,
(d) heat responsive expandible material in the chamber,
(e) sealing means encasing the expansible material and preventing its escape from the chamber, said sealing means including a resilient elastic diaphragm portion which extends into the bore and becomes elongated by further extention into the bore by pressure exerted by the expansible material when heated to thereby actuate the piston shaft, and a chamber defining annular wall which fits in the recess and is threaded to engage the internal threads on the housing, and an end wall for encasing the material in the chamber, and
(f) means for heating the expansible material in the chamber.

2. The thermal motor defined by claim 1, which includes a heating element in the chamber, electrical wires connected to the heating element, and insulating seals located in the end wall of the sealing means through which the wires extend outwardly to a source of current.

3. The thermal motor defined by claim 1, in which the end wall of the sealing means is a non-elastic wall integral with the annular wall of the sealing means.

4. The thermal motor defined by claim 1, in which the end of the resilient elastic diaphragm portion of the sealing means which faces the piston shaft is convex on its shaft facing surface.

References Cited

UNITED STATES PATENTS

| | | | |
|---|---|---|---|
| 2,736,604 | 2/1956 | Albrigth | 60—23 |
| 2,835,634 | 5/1958 | Vernet et al. | 60—23 |
| 2,938,384 | 5/1960 | Soreng et al. | 60—23 |
| 3,213,606 | 10/1965 | Martin et al. | 60—23 |
| 3,330,480 | 7/7967 | Drapeau et al. | 73—368.3 X |
| 2,841,983 | 7/1958 | Vernet | 60—23 X |

CARROLL B. DORITY, JR., Primary Examiner

U.S. Cl. X.R.

73—368.3